June 24, 1930.  H. SWARTZ  1,766,151

SPARK PLUG TESTER

Filed May 22, 1928  2 Sheets-Sheet 1

INVENTOR
Hugh Swartz
BY
Frank Warren
ATTORNEY

June 24, 1930.  H. SWARTZ  1,766,151
SPARK PLUG TESTER
Filed May 22, 1928   2 Sheets-Sheet 2

INVENTOR
Hugh Swartz
BY
Frank Warren
ATTORNEY

Patented June 24, 1930

1,766,151

UNITED STATES PATENT OFFICE

HUGH SWARTZ, OF SEATTLE, WASHINGTON

SPARK-PLUG TESTER

Application filed May 22, 1928. Serial No. 279,666.

My invention relates to improvements in devices for testing spark plugs to determine whether or not said spark plugs are capable of producing an efficient spark under operating conditions and the object of my invention is to provide a device in which a spark plug may be tested and the results of the tests observed while the terminals of the said spark plug are surrounded by air under a relatively high pressure, which pressure may be approximately the same as the pressure under which the spark plug is required to operate when it is in an an internal combustion engine.

Another object is to provide a spark plug tester embodying a housing formed in part of transparent material and in part of metal, said metal part having openings for receiving and holding spark plugs so that the terminals of said plugs are within said housing and may be seen through the transparent portion of the same, said housing having a pressure gauge thereon and being connected with means for admitting air under pressure and said testing device being provided with means for supplying electric current to the spark plugs.

Other and more specific objects will be apparent from the following description taken in connection with the accompanying drawings.

In the drawings Figure 1 is a plan view of a spark plug tester constructed in accordance with my invention.

Figure 1:
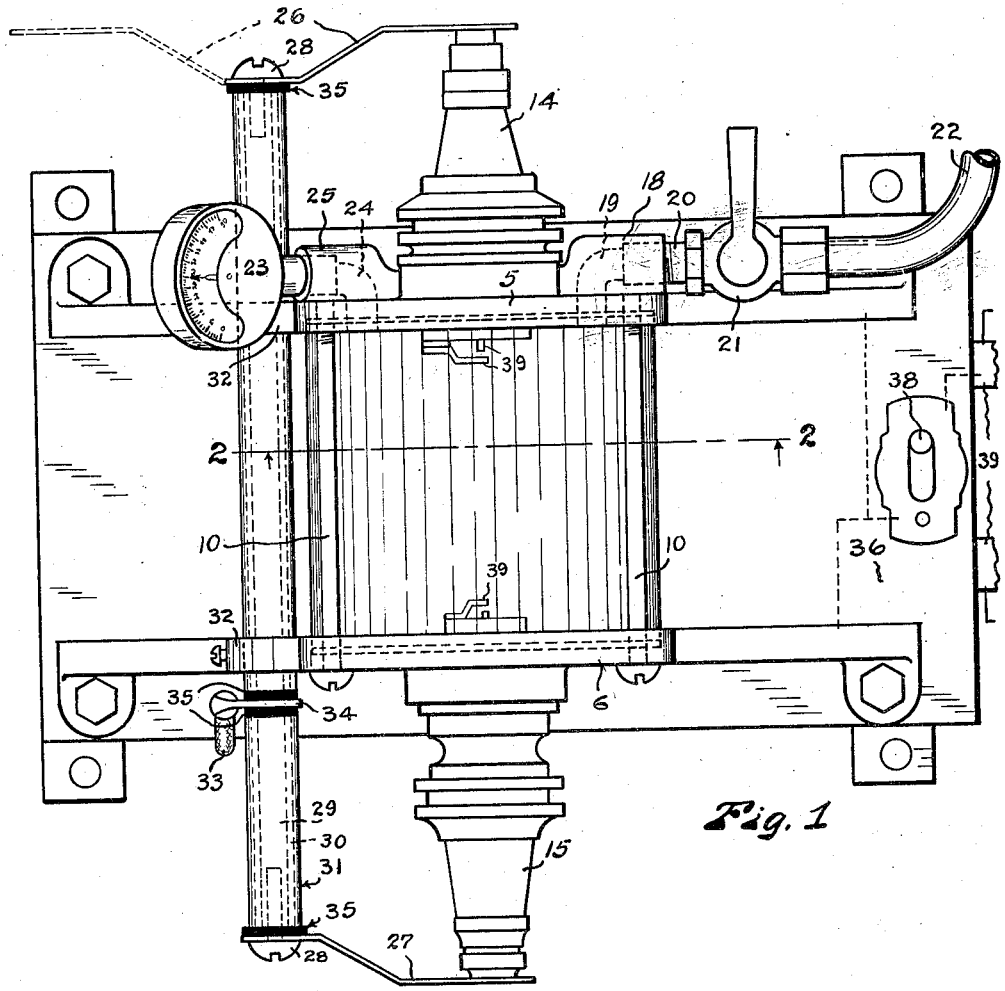
Figure 2:
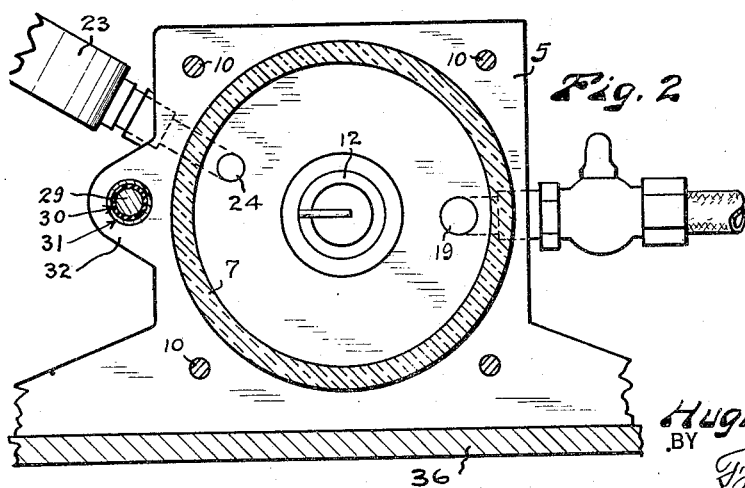
Fig. 2 is a cross section of the same substantially on broken line 2—2 of Fig. 1.
Figure 3:
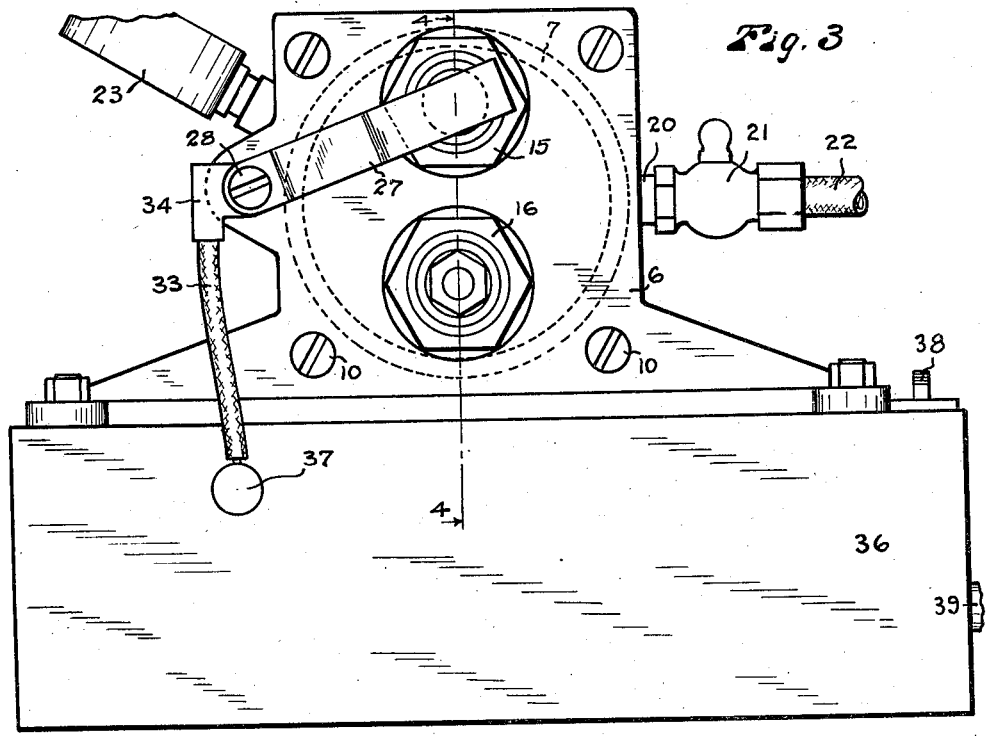
Fig. 3 is a side elevation of one side of the device.
Figure 4:
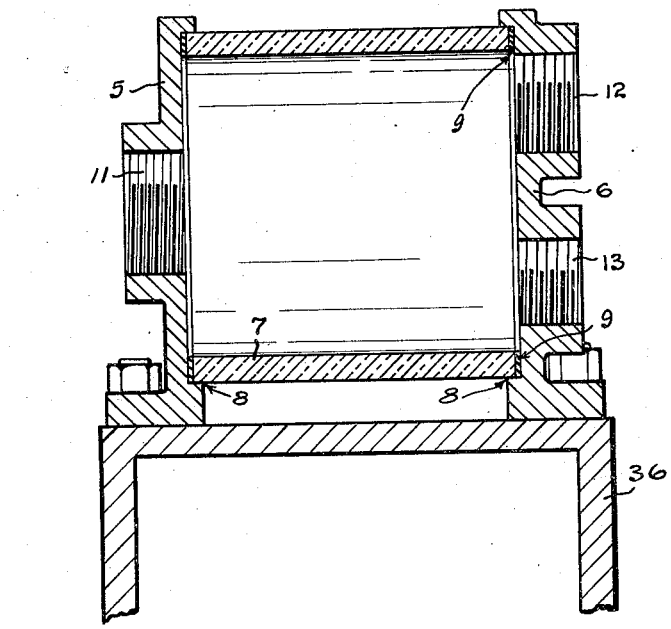
Fig. 4 is a sectional view on broken line 4—4 of Fig. 3.

Referring to the drawings, throughout which like reference numerals designate like parts, 5 and 6 designate two upright spaced parallel end plates between which is disposed a hollow cylinder 7 of relatively strong heavy glass. The end plates 5 and 6 are counterbored as at 8 on their inner surfaces for the reception of the ends of the cylinder 7 and sealing washers or gaskets 9 of soft air tight material are interposed between the end plates and the ends of the cylinder 7. Bolts or screws 10 extend crosswise between the end plates 5 and 6 at suitable intervals around the cylinder 7 for clamping the end plates tightly against the ends of the cylinder. The two end plates 5 and 6 have suitable bosses wherein are provided, internally threaded openings 11, 12 and 13, see Fig. 4, for the reception of spark plugs 14, 15 and 16 respectively. In practice I find that three of said openings of different size are all that are needed for the various sizes of spark plugs now on the market, but it is obvious that as many of said openings of different size as are desired may be provided.

One of the end plates 5 is provided with a boss 18 having an opening 19 formed therein for the inlet of air under pressure. Said opening 19 is connected through a nipple 20 and three-way valve 21 with an air supply conduit, as a hose 22.

A pressure gauge 23 is connected with the interior of the housing 7 by an opening 24 formed in a boss 25 on the end plate 5.

The electrical connections to the spark plugs embody two flat springs 26 and 27 of one or more plies of thin resilient electrically conductive metal. These springs are mechanically and electrically connected by screws 28 to the ends of a metal rod 29, but are free to be turned by hand as hereinafter explained. The metal rod 29 is enclosed within a tube 30 of insulating material and the tube 30 is disposed within an outer metal tube 31 which is supported in lugs 32 on the end plates 5 and 6.

A circuit wire 33 is connected by a clip 34 with the metal rod 28. Suitable insulation washers 35 are provided for insulating the springs 26 and 27 and the clip 34 from the tube 31. The circuit wire 33 is connected through binding post 37 with a suitable transformer not shown, which is contained within the box 36. The transformer may be of any standard type commonly used in automobile ignition systems. A manually operated switch 38 may be provided on the top of the coil box 36 to open and close the circuit to the spark plugs, one terminal of each spark plug being grounded on end plates 5 and 6.

The end plates 5 and 6 preferably rest upon and are secured to the top of the box 36 thus making a very convenient and unitary construction. Binding posts 39 may be provided on the front end of the box 36 as shown. The binding post 37, switch 38 and binding posts 39 are essentially insulated from box 36.

Suitable plugs, not shown, may be provided for closing the openings 12, 13 and 14 when no spark plugs are contained therein.

In the operation of this spark plug tester the plug or plugs to be tested are screwed tightly into the openings 11, 12 and 13 and the contact springs 26 and 27 turned so as to engage the ends of said spark plugs; air is then admitted to raise the pressure around the terminals 39 of said spark plugs to approximately the known pressure under which the plugs are required to fire in an internal combustion engine as indicated by the pressure gauge; electric current is then admitted to the plug by closing switch 38 and the nature of the spark thereby produced is observed. In testing the spark plug the air pressure may be gradually raised within the housing 7 and the switch 38 opened and closed repeatedly until a pressure is reached at which the spark plug ceases to function and no spark is produced. This shows the pressure at which any particular spark plug will break down. The electrical connections to the spark plugs are completed by grounding on plates 5 and 6.

The device is simple in construction, has no working parts to get out of order, is not expensive to manufacture and gives a reliable and efficient test of the spark plugs under substantially the working conditions of said plugs.

The valve 21 is arranged so that the desired amount of compressed air may be admitted to the receptacle and the valve then turned so as to close off the source of supply and hold said pressure in said receptacle, which pressure may be lowered by turning said valve to a third position to exhaust some or all of the air from the receptacle.

The foregoing description and accompanying drawings clearly disclose a preferred embodiment of my invention but it will be understood that this disclosure is merely illustrative and that such changes may be made as are fairly within the scope and spirit of the following claims.

What I claim is:—

1. A spark plug tester, embodying a hollow glass cylinder, two end plates forming air tight closures for the ends of said cylinder, said end plates having threaded openings into which spark plugs may be screwed, means for supplying air under pressure to said cylinder, a metal rod extending crosswise of said end plates and insulated therefrom, a contact spring pivotally connected with the end of said rod, and means for supplying electric current to said rod.

2. A spark plug tester, embodying a hollow glass cylinder, two end plates forming air tight closures for the ends of said cylinders, said end plates having threaded openings into which spark plugs may be screwed, means for supplying air under pressure to said cylinder, a metal rod extending crosswise of said end plates and insulated therefrom, a contact spring pivotally connected with each end of said rod and arranged to be placed in contact with the outer ends of the spark plugs, the inner ends of the spark plugs being grounded on said end plates, a coil box supporting said end plates, and means for supplying current from the coil box to said metal rod.

In witness whereof, I hereunto subscribe my name this 15th day of May, A. D. 1928.

HUGH SWARTZ.